United States Patent [19]

Daubenmier et al.

[11] Patent Number: 4,514,811
[45] Date of Patent: Apr. 30, 1985

[54] FORWARD DRIVE RELEASE SYSTEM FOR AUTOMATIC TRANSMISSION

[75] Inventors: John A. Daubenmier, Canton; Elias T. Boueri, Farmington, both of Mich.

[73] Assignee: Ford Motor Company, Dearborn, Mich.

[21] Appl. No.: 393,208

[22] Filed: Jun. 28, 1982

[51] Int. Cl.³ ............... B60K 41/28; G05B 15/02; G05D 17/02
[52] U.S. Cl. .............. 364/424.1; 192/0.033; 192/0.076
[58] Field of Search ........... 364/424.1; 74/866, 867; 192/0.033, 0.052, 0.055, 0.076, 0.092

[56] References Cited

U.S. PATENT DOCUMENTS

| | | | |
|---|---|---|---|
| 1,943,534 | 1/1934 | Koulichkov et al. | 192/0.055 |
| 1,996,282 | 4/1935 | Drabin et al. | 192/0.055 |
| 2,608,880 | 2/1952 | Flinn | 74/866 |
| 4,105,101 | 8/1978 | Forster et al. | 192/4 A |
| 4,200,175 | 4/1980 | Dick | 192/0.092 |
| 4,298,109 | 11/1981 | Dorpmund et al. | 192/4 A |
| 4,324,322 | 4/1982 | Sibeud | 192/0.092 |
| 4,343,387 | 8/1982 | Hofbauer | 192/0.076 |
| 4,361,060 | 11/1982 | Smyth | 192/0.092 |
| 4,401,199 | 8/1983 | Takano et al. | 192/0.092 |

FOREIGN PATENT DOCUMENTS 1067313 10/1959 Fed. Rep. of Germany ........ 74/866

Primary Examiner—Felix D. Gruber
Attorney, Agent, or Firm—Frank G. McKenzie; Donald J. Harrington

[57] ABSTRACT

A control system for reducing the torque applied to an automotive engine when the vehicle is idling and the transmission is set for operation in an acceptable drive range includes sensors to determine the manual gear selector position, output shaft speed, engine speed, turbine speed, and the throttle valve position. A solenoid operated valve opens and closes a source of high pressure fluid to a clutch whose engagement is required to transmit torque through the transmission from the engine to the drive wheels. An electronic computer is supplied with the digital equivalent of the shaft speeds, the position of the gear selector and of the throttle. An equation for determining the duty cycle of the solenoid valve coils is repetitively calculated through the use of a computer program algorithm. The equation corrects a previously calculated duty cycle with feedback error and terms that are proportional to the magnitude of the present error and the magnitude of the previous error.

9 Claims, 6 Drawing Figures

FORWARD DRIVE RELEASE SYSTEM FOR AUTOMATIC TRANSMISSION

BACKGROUND OF THE INVENTION

1. Field of the Invention

The present invention relates to a control system for an automatic transmission of the type having a planetary gear train and hydraulically actuated brake and clutch elements that selectively hold components of the gearset to produce the various drive ratios of the transmission. More particularly, the present invention relates to a control system that senses an idle or coasting condition in a forward drive range and automatically disengages a brake or clutch element thereby placing the transmission in neutral and removing load from the engine.

2. Description of the Prior Art

Hydraulically actuated, mechanically driven automatic transmissions generally include a turbine driven hydrodynamically from the impeller of a torque converter, the turbine transmitting power to the gearset to produce the forward drive ratios. When any forward or reverse gear is selected and though the vehicle is coasting or standing at idle, the engine transmits torque through the torque converter, the various clutches and gears to the drive wheels. In the idle condition, this causes the vehicle to creep forward, although the accelerator pedal is released, against the action of the service brake which must be activated to keep the vehicle stationary. Normally, the gear selector must be moved to the neutral position to disengage the forward gear.

It is preferable that the transmission be automatically shifted to the neutral position from the forward gear position whenever engine power is not required during the idle and coasting condition. The engine idle system can then be calibrated to improve fuel economy by reducing the torque transmitted through the automatic transmission.

Various hydraulic automatic transmission control systems have been devised such that a brake element is disengaged depending upon the setting of the gear selector, the application of accelerator pedal and the partial application of the brake pedal. For example, U.S. Pat. No. 4,298,109 describes a system for selectively interrupting the supply of pressurized fluid to a gear shift element of the transmission when the accelerator pedal is released and the brake pedal is depressed. The system is entirely hydraulically actuated and the logic is implemented through the use of control valves that open and close two sources of pressurized fluid to the gear shift element.

U.S. Pat. No. 4,105,101 describes a control system for automatically disengaging a brake element of a transmission operating in the lowest speed range in which a servo device is disengaged depending upon the actuation of the service brake. When the brake is actuated the transmission is temporarily shifted from the lowest gear ratio to neutral so that vehicle creeping is eliminated. This patent describes a brake-operated low gear ratio release system for an automatic transmission equipped with a mechanism for raising the idling rotational speed of the engine during warm up. A servo that selectively engages and disengages a gear ratio element of the gearset is automatically disengaged on actuation of the vehicle brake provided the transmission is operating in the lowest speed ratio.

It is preferable that a control system for automatically shifting a transmission to neutral not rely on the operative condition of the vehicle service brake. Instead, it is better that the control system perform its function depending on the road speed of the vehicle and the speed of certain drive shafts in the transmission, which give an accurate indication of the current torque requirement that should be placed on the engine.

SUMMARY OF THE INVENTION

The control system according to this invention automatically places the transmission in neutral, provided the transmission is operating in the low speed coast or idle conditions, thereby reducing the torque requirement of the engine. By calibrating the engine for the reduced torque requirement at idle or coast, fuel economy gains can be achieved. It is an object of this invention that the neutral idle system can be activated if the transmission is operating in a forward drive ratio that requires no engine braking, the throttle is closed or nearly closed and the vehicle speed is less than a predetermined speed. Information concerning the state of these conditions is derived from a manually operated gear shift selector, a throttle valve position indicator and a sensor for measuring speed of the output shaft of the transmission. Logic programmed in an electronic computer is used to determine whether the requisite conditions exist. If they do not, the transmission is controlled in its normal way; if the conditions do exist, the neutral idle control is enabled.

It is another object of this invention that a hydraulically actuated brake or clutch of the planetary gearset, whose engagement is required for forward drive, be selectively modulated according to a duty cycle that is repetitively calculated by an electronic computer. It is a further object of this invention that the solenoid valve that opens a source of higher pressure fluid to the braking element be activated and deactivated by a pulse width modulated signal derived from the calculated duty cycle.

It is another object of this invention that the duty cycle calculation includes an error signal derived on the basis of the difference between the engine speed and the turbine speed of a torque converter. A predetermined, desired difference in these speeds is compared to the most recently calculated value for the speed difference. This difference, the error upon which the control system operates, is used in the calculation of the current duty cycle by correcting a previously calculated duty cycle by an amount that is proportional to the error. The previously calculated duty cycle is further corrected by a term whose magnitude varies with the difference between the currently calculated speed difference and the previously calculated speed difference.

It is another object of this invention that the brake or clutch of the transmission, whose disengagement places the transmission in idle, not be fully vented during the idle condition, but instead be pressurized sufficiently to take up design clearances and tolerances within the brake or clutch but at a pressure low enough so that the brake or clutch transmits little or no torque. In this way, forward vehicle creep in the idle condition is eliminated yet the brake or clutch can be reengaged without undue and objectionable delay when demand for greater torque is placed on the engine by opening the throttle valve.

DESCRIPTION OF THE PREFERRED EMBODIMENT

Figure 1:
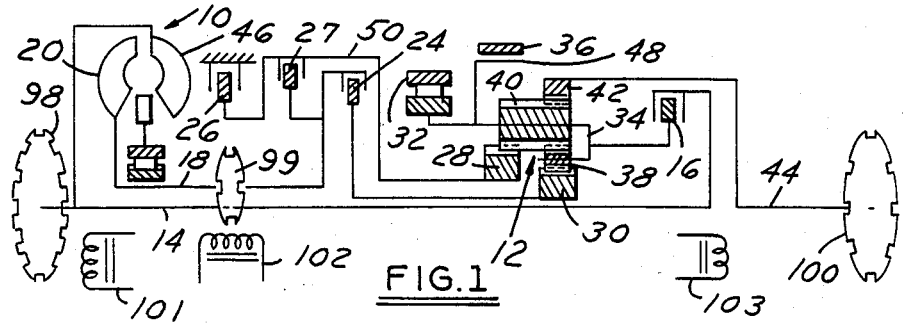
FIG. 1 is a schematic diagram illustrating the gear arrangement, brake elements, torque converter and the connecting shafts of an automatic transmission to which the neutral idle control of this invention is applicable.

FIG. 1 shows an example of an automatic transmission to which the neutral idle control system according to the present invention may be applied. The compound planetary gearset 12 provides four forward speed ratios that include one direct drive, an overdrive and two speed reductions and a reverse speed ratio, these resulting from selective engagement of the various clutches and the brake band.

The transmission includes a torque converter 10 which couples the engine crankshaft to the planetary gearset 12 and provides torque multiplication equivalent to an additional gear reduction in certain driving conditions. A direct drive shaft 14 couples the engine directly to the direct clutch 16, bypassing the torque converter 10. A turbine input shaft 18 splined to the turbine 20 of the torque converter transmits torque from the converter to the reverse clutch 27 and to the forward clutch 24. An intermediate/overdrive clutch 26 holds the reverse sun gear 28 stationary in the second gear ratio, in the overdrive range and in the 1-range, i.e., manually selected low gear. Reverse clutch 27 couples turbine input shaft 18 to the reverse sun gear 28 in the reverse drive ratio only. Forward clutch 24 couples turbine input shaft 18 to the forward sun gear 30 in the first, second and third gear ratios, but not in the overdrive range.

A planetary one-way clutch 32 holds planet carrier 34 to produce first gear drive when the gear selector is positioned in the overdrive range and in the 3-range. Clutch 32 also permits free-wheeling during an automatic coasting downshift while in first gear. The low reverse band 36 is applied and released through operaton of a low reverse servo (not shown), holds planet carrier 34 stationary in low gear and reverse gear, and permits engine braking in manually selected low gear. Direct clutch 16 couples driveshaft 14 to the planet carrier assembly in third gear and in overdrive. When the gear selector is manually set by the operator to the overdrive position, the transmission will upshift and downshift automatically through the four forward ratios. From a standing start, the transmission is in low gear and successively upshifts to second, direct and overdrive as road speed increases. During coasting or braking, the transmission downshifts through all the gears as the vehicle coasts and comes to a stop. Operation in the overdrive gear ratio can be prevented by moving the shift selector to the 3-range where the transmission upshifts and downshifts only through first, second and third gear ratios. When the shift selector is moved to the manual low position or 1-range, the transmission is locked in low gear and the low-reverse band is applied for engine braking. If the shift selector is moved to the 1-range from the O/D ratio or 3-range the transmission will downshift to second gear at road speeds greater than 25 mph and then downshift to the first speed ratio at road speeds less than 25 mph.

GEAR ARRANGEMENT AND CLUTCHES

The planetary gearset 12 includes reverse sun gear 28 driven by the turbine input shaft 18 when reverse clutch 22 is applied. Sun gear 28 can also be held stationary by applying intermediate/overdrive clutch 26 instead. Forward sun gear 30 is driven in first, second and third gear ratios from the turbine input shaft through the forward clutch 24. Forward sun gear 30 continuously meshes with the short pinions 38, which mesh with long planet pinions 40. The short pinions do not mesh with the ring gear 42, but drive the ring gear through the long pinions. The long pinions 40 and short pinions 38 are mounted for rotation on carrier 34, which can be held stationary by either the low reverse band 36 or the planetary one-way clutch 32. Reverse sun gear 28 also meshes with long pinions 40. Ring gear 42 is drivably coupled to output shaft 44 and the output from the gearset is always through ring gear 42.

In the O/D-range and the 3-range, the first gear ratio is produced by applying the forward clutch 24 and holding planet carrier 34 from turning through operation of one-way clutch 32. In this case, the engine drives the impeller 46 of the converter whose turbine 20, driven hydraulically, drives the forward sun gear 30 through the turbine shaft 18 and forward clutch 24. Sun gear 30 drives the short pinions 38 which drive the long pinions 40 and these drive the ring gear at a reduced speed from that of the turbine shaft.

In the coast condition, one-way clutch 32 overruns; therefore, there is no engine braking in the first gear of the overdrive and drive ranges. To provide engine braking the shift selector is moved to the 1-range (manual low) and low reverse band 36 is applied to hold carrier drum 48 against rotation. In this way engine braking is available, whereas in the overdrive and drive ranges the planetary one-way clutch would be overdriven.

In the overdrive and 3-ranges, the second or intermediate gear ratio is produced by applying the intermediate/overdrive clutch 26, thereby fixing reverse sun gear 28 to the transmission case, and by applying forward clutch 24, thereby locking turbine shaft 18 to the forward sun gear 30. In this case, the planetary gearset is driven from the forward sun gear 30 and reverse sun gear 28 provides a reaction point. The forward sun gear drives short pinions 38 and long pinions 40, which drive the ring gear 42 and the output shaft 44 around the circumference of the stationary sun gear 28.

When direct clutch 16 is applied, direct drive input shaft 14 drives the planet carrier assembly 34 at engine speed, bypassing the converter turbine 20. The planetary one-way clutch 32 overruns when the direct clutch is applied. The third gear ratio in the 3-drive range is produced when the forward clutch 24 is applied to lock the turbine shaft 18 to the forward sun gear 30 and the direct clutch 16 is applied to couple the direct drive input shaft 14 to the planet carrier 34. When this is done, direct clutch 16 drives planet carrier 34 at engine speed, the converter turbine 20 is driven hydraulically near engine speed and the turbine shaft drives the forward clutch and the forward sun gear. This effectively locks up the gearset, which rotates as a unit causing the long pinions 40 to drive the output shaft 44.

In the overdrive range the fourth speed ratio is produced when intermediate/overdrive clutch 26 is applied to fix reverse sun gear 28 to the transmission casing and direct clutch 16 is applied to couple the planet carrier 34 to the engine. With these clutches applied, drive shaft 14 drives carrier 34 at engine speed; the long planet pinions 40 revolve around the circumference of reverse sun gear 28, held stationary by clutch 26; and ring gear 42 and output shaft 44 are driven by pinions 40 at a speed faster than the engine speed.

When reverse clutch 22 is applied, the turbine input shaft 18 is coupled to the clutch drum 50, which is fixed to the reverse sun gear 28. Therefore, when clutch 22 is applied, sun gear 28 is driven at turbine speed in addition to applying the reverse clutch. Reverse drive is produced when the low/reverse band 36 is applied to hold planet carrier 34 stationary. The torque delivery path for reverse drive, therefore, includes the impeller turbine 20, driven hydraulically from the impeller 46; reverse sun gear 28, which drives the long planet pinions 40; and the ring gear output shaft, which is driven by the planet pinions. The short planet pinions 38 and the forward sun gear 30 rotate in reverse drive but they do not transmit torque.

Figure 2:
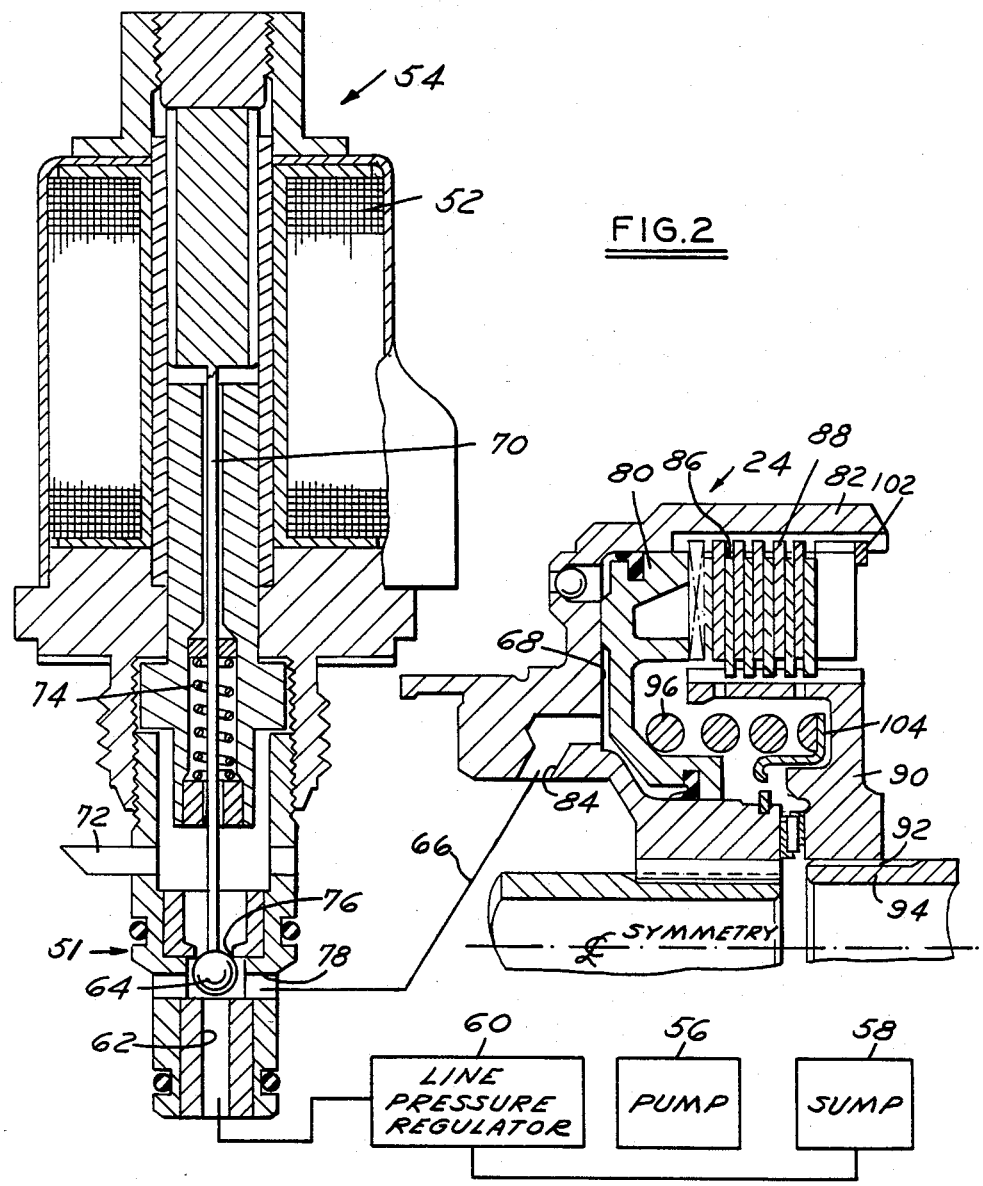
FIG. 2 is a cross section taken on a diametric plane through the solenoid, the valve it operates and the clutch that is engaged and disengaged through operation of the neutral idle control.
Figure 3:
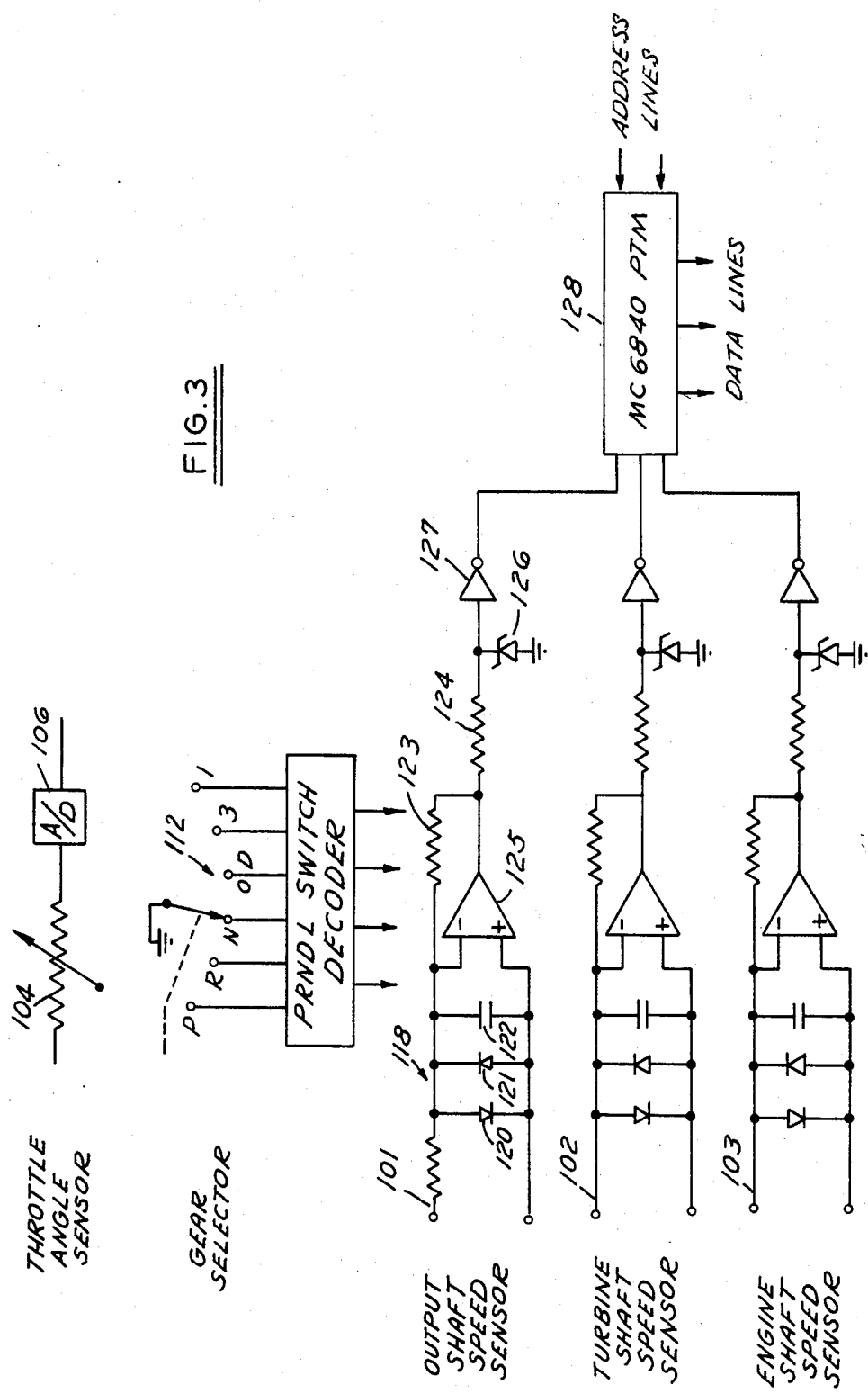
FIG. 3 shows schematically the throttle angle sensor, gear selector sensor and shaft speed sensors that produce information used in the neutral idle control.
Figure 4:
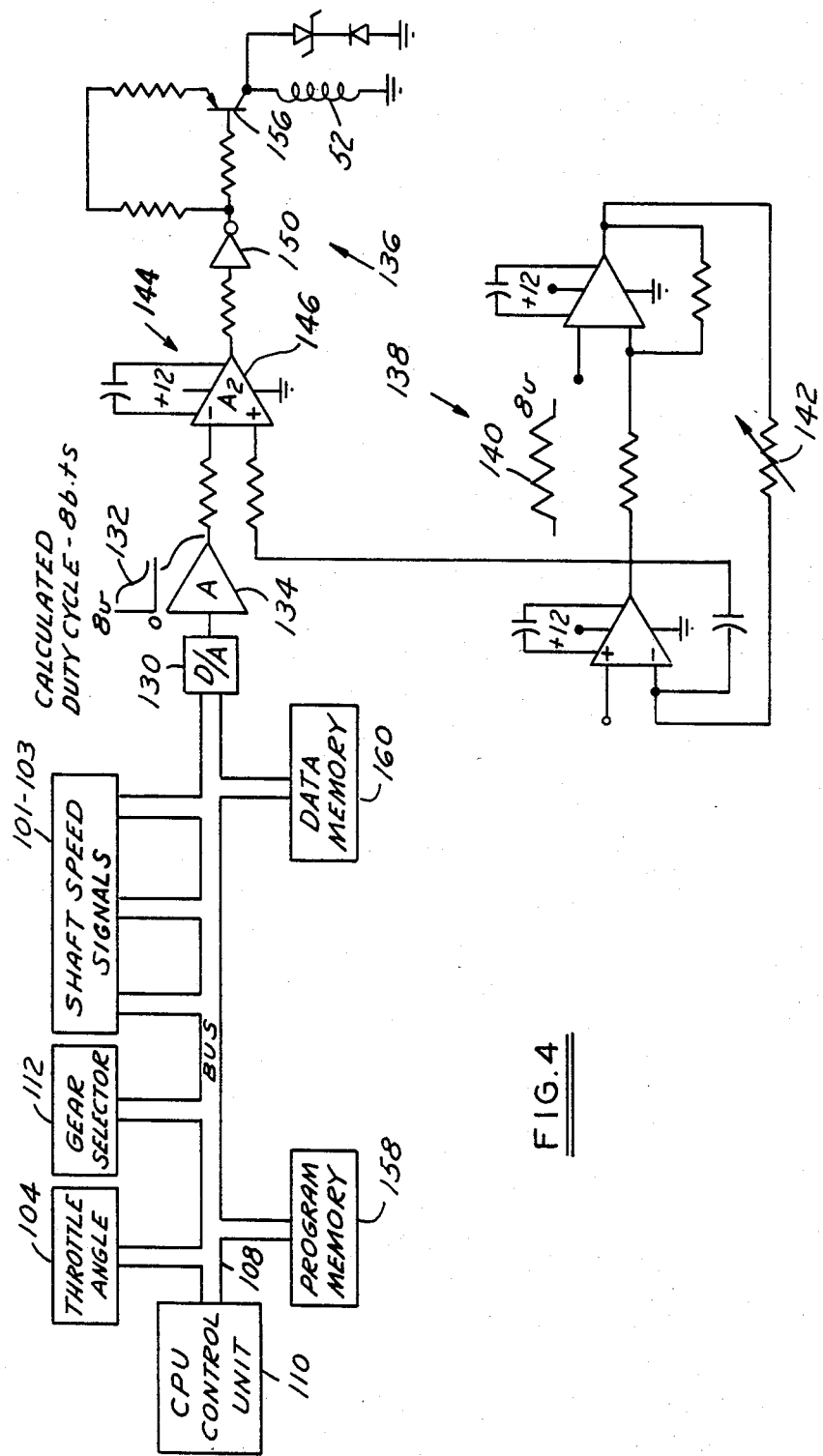
FIG. 4 is a schematic circuit diagram of the data acquisition components, the computer, its associated memory and the driving circuit that converts the computer output to an analog signal that energizes the solenoid.

With the gear selector positioned in the overdrive range or in the 3-range, forward clutch 24 is applied in order to produce the first three forward speed ratios. FIG. 2 shows solenoid operated valve 51 through which forward clutch 24 is engaged and disengaged as the windings 52 of the solenoid 54 are energized and deenergized. A positive displacement pump 56 whose inlet is connected to the sump 58 has its outlet connected to a line pressure regulator system through which the inlet 62 of the valve 51 is supplied. The solenoid valve has a ball element 64 that is moved downward into a seated position on the inlet 62 when the windings are energized. The field produced by the windings moves the plunger 70 downward and holds the ball element in a closed position on the inlet thereby opening communication between hydraulic line 66 and vent port 72. When windings 52 are deenergized, plunger 70 is biased upward by the force of compression spring 74 and ball element 64 is moved by the pressure force of line pressure applied at inlet 62 to move the ball element upward into a seated position on an orifice 76. When the windings are deenergized hydraulic fluid at line pressure is applied to clutch cylinder 68 through hydraulic line 66 and the inlet 62. Vent port 72 is closed to the inlet 62 at port 76.

Clutch 24 includes a hydraulic piston 80, which is moved within cylinder 68 formed in clutch housing 82 due to the effects of hydraulic fluid that enters and leaves the cylinder through port 84 and the force of the spring 96. The clutch includes internally splined plates 86 and alternating externally splined plates 88. Plates 86 are splined to hub 90, which is splined at 92 to a gear element of the planetary gear set. Plates 88 are splined to clutch housing 82. Therefore, hydraulic pressure applied to the clutch piston forces the plates together and produces frictional force between the plates that couples the clutch housing to the gear element 94. A clutch spring 96 applies a force to piston 80 in opposition to the pressure force developed on the piston, thereby returning the piston to the position shown in FIG. 2 when hydraulic pressure is removed from the cylinder. In this way the clutch housing is disconnected from the gear element.

Input signals required by the transmission neutral idle control system are generated by three types of sensors. Variable reluctance magnetic pickups 101–103 for measuring rotational speed of the engine crankshaft, turbine shaft 18 and the transmission output shaft 44 include discs 98–100 mounted on each of the shafts, the discs having notches formed on their outer circumferences. Coils located adjacent the discs have an electric current induced whose frequency corresponds to the rotational speed of the shaft. Disc 98 mounted on the engine crankshaft has preferably 164 teeth on its circumference, disc 100 on the turbine shaft has 12 teeth and disc 102 on the output shaft has 24 teeth. Each speed sensor is a passive magnetic induction coil consisting of a magnet and coil potted in epoxy resin encased in stainless steel. When the magnetic field of the sensor magnet is interrupted by a gear tooth the coil generates a voltage pulse. The frequency of the pulse produced by the sensor is processed by the control electronics. The sensors are of the type manufactured by Electro Corporation, Model Nos. 3015HTB and No. 3055A.

The throttle position information is obtained from a rotary potentiometer for sensing the throttle angle. This sensor uses a variable resistive element 104 across which is developed a voltage that varies in proportion with the throttle angle. The throttle position sensor is mounted on the choke side of the carburetor, the throttle shaft extending through the center of the sensor thereby changing the value of the variable resistance as the throttle position sensor is rotated by the throttle shaft. The analog voltages produced are proportional to the throttle angle. This variable voltage is applied to an analog-to-digital converter 106 that converts the analog voltage to a binary data word that is transmitted on data bus 108 to the control unit of microprocessor 110.

The gear selector, moved by the vehicle operator to select the various modes of operation, provides a binary coded data word to the control electronics, each word corresponding to one of the selector positions, Park, Reverse, Neutral, Overdrive, Three and One. The gear selector switch 112 consists of a rotor slotted to fit over the manual selector lever which rotates as the gear selector lever is moved. It provides a unique digital data word for each selected position, which is carried on data bus 108 to the central processing unit 110 that is used to control operation of the neutral idle system.

Each magnetic pickup that senses the speed of the shafts includes an armature or reluctor having gear like teeth formed on the circumference and a permanent magnet inside a small coil. The coil is fixed in place to a preset air gap with the reluctor. Each pickup produces a simple alternating current signal 114, shown in FIG. 5, that swings from positive to negative each time one of the gear teeth on the reluctor passes the permanent magnet in the coil. When a gear tooth is exactly opposite the coil, the current waveform is at zero. The waveforms 114 are filtered and converted to a signal pulse train 116 which is clamped by the clamping circuits 118 to approximately 0.7 volts. Each clamping circuit includes diodes 120, 121, a capacitor 122, resistors 123, 124, an operational amplifier 125, a Zener diode 126 and an inverter 127.

The shaft speed is established by determining the time elapsed between the positive going edge of waveform 116. The clamped waveforms are applied as input to programmable timer modules 128, which may be Motorola MC6840 programmable timer-counter modules. The first rising edge of pulse 116 starts the counter and the next rising edge of the waveform stops the counter. During this period the number of pulses produced by the clock, which is integral with module 128, is counted and retained until it is sent by way of bus 108 to the control unit 110. After this, the counter is initialized and begins to count until the next occurrence of a rising edge of waveform 116.

The computer repetitively calculates the duty cycle according to the method described in succeeding paragraphs and produces an eight bit data word that is transmitted on bus 108 to a digital-to-analog converter 130. The D/A converter produces an output voltage that varies proportionally to the value of the data word such that if the data word value is zero, the analog voltage produced is zero volts and if the data word value is 255, the output produced is 5 volts. The output of converter 130 is applied as input to an amplifier 134, which produces an analog voltage that varies in proportion to the D/A output, but within the range zero to eight volts. The waveform produced by amplifier 134 is identified in FIG. 5 as waveform 132.

A pulse width modulation driver circuit 136 accepts and processes analog voltage signal 132 produced by amplifier 134 so that the zero percent duty cycle will correspond to zero volts and 100 percent duty cycle will correspond to eight volts. Oscillator circuit 138 produces a triangular wave 140 whose amplitude varies between zero and eight volts according to the setting of potentiometer 142. It has been determined that the neutral idle control operates best when the period of the oscillator is 10 Msec.

A second stage of the driver circuit includes a comparator 144 that receives, at the inverting terminal of op amp 146, the amplified analog voltage signal representing the voltage equivalent of the data word that corresponds to the duty cycle calculated in the computer. The noninverting terminal of op amp 146 is connected to the output of oscillator 138. Comparator 144 compares the magnitude of signal 132 with the triangular wave 140 and produces a pulse width modulated signal that is applied to the solenoid coil 52 after the signal is inverted by inverter 150.

Figure 5:
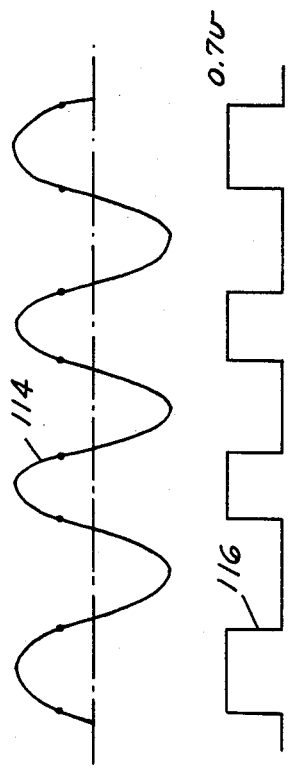
FIG. 5 are waveforms produced at the output of certain components shown schematically in FIGS. 3 and 4.
Figure 5:
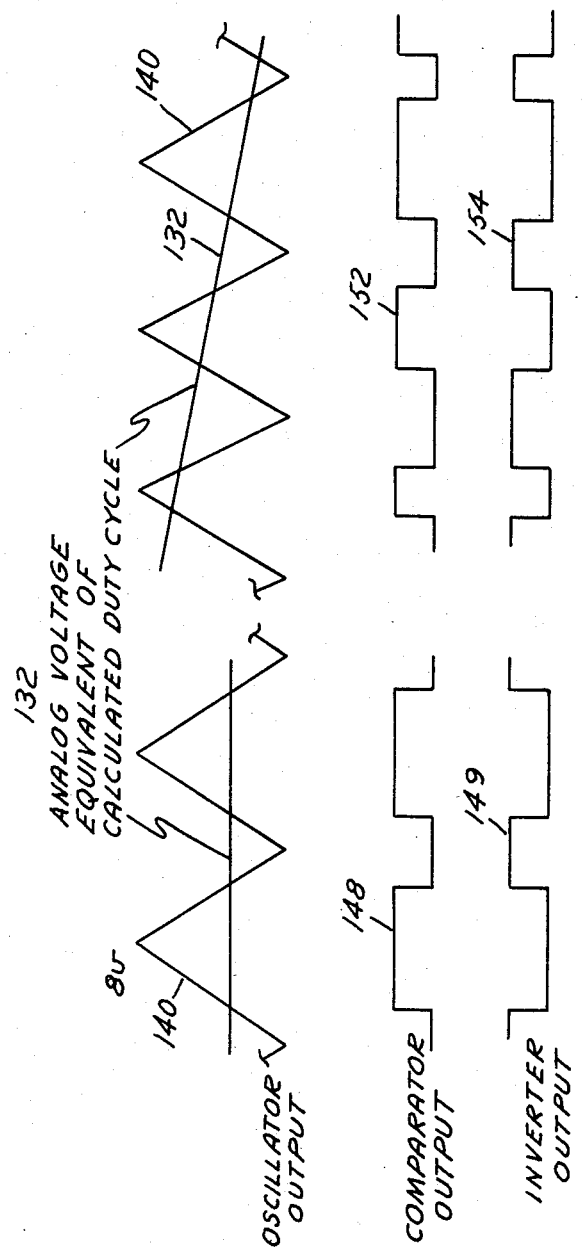

FIG. 5 illustrates a comparator output pulse 148 that results from a calculated duty cycle that is nonvarying with time. Pulse waveform 152 represents the comparator output produced when the data calculated duty cycle word and its voltage equivalent 132 varies with time. The inverter output corresponding to waveform 152 is waveform 154 and waveform 149 corresponds to comparator pulse 148. The period during which pulse 154 is high is a function of the magnitude that represent the duty cycle data word calculated by the computer. Therefore, when the duty cycle value is high, waveform 154 is high for a longer period than when the duty cycle is a low value.

The pulse waveforms at the output of inverter 150 are applied to the base of a p-n-p power transistor 156 which may be an MGE6040. When the inverter pulse is high, transistor 156 is on and the solenoid coil 52 is energized causing the ball element 64 of the solenoid valve to move to the closed position against the force of the compression spring 74. This opens clutch cylinder 68 to the vent port 72.

Figure 6:
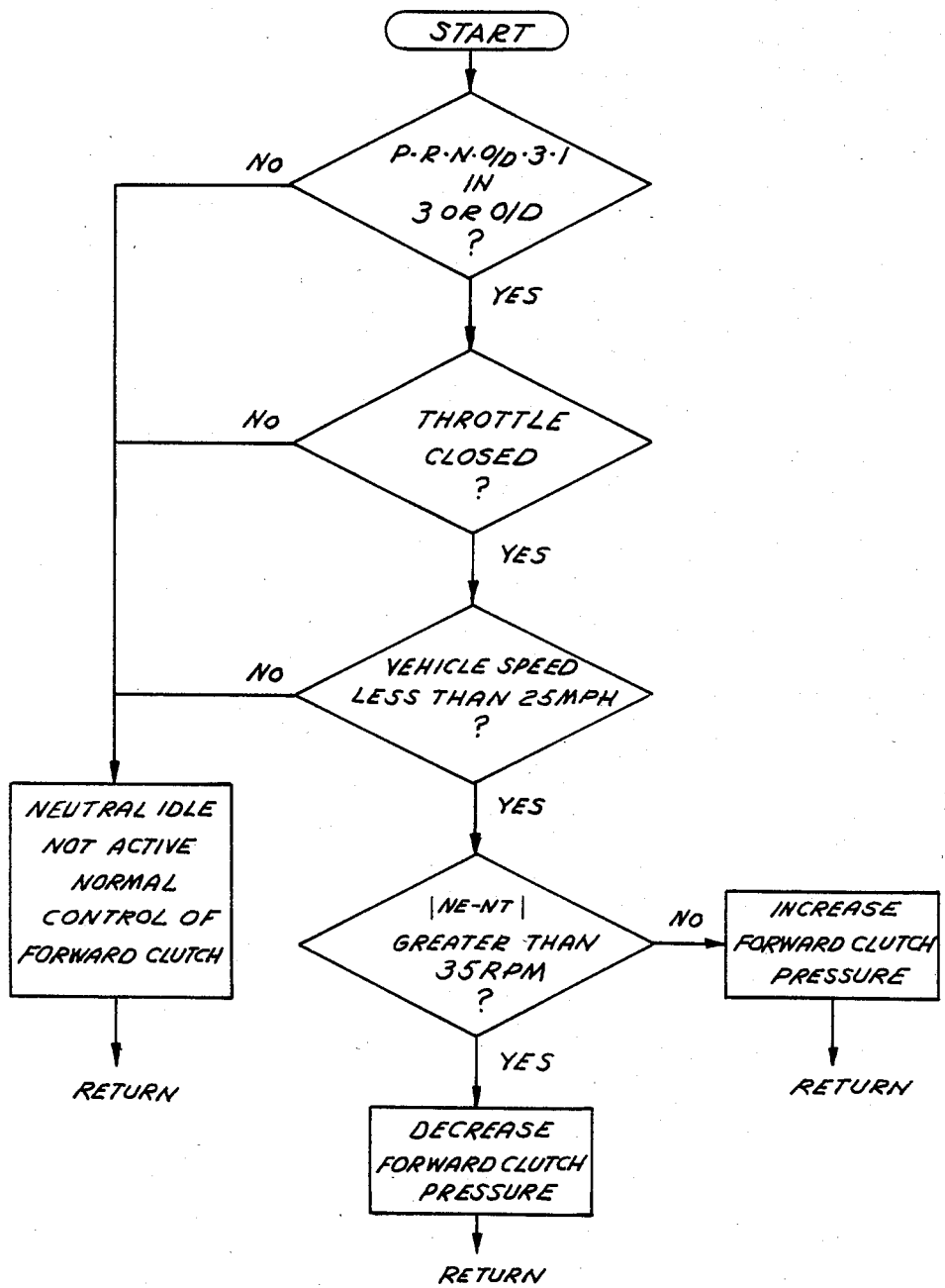
FIG. 6 is a flow diagram illustrating the logic upon which the neutral idle control strategy operates.

The neutral idle control strategy is illustrated in the flow chart of FIG. 6. The neutral idle control is activated when the following conditions are satisfied: gear selector 112 is placed in a forward drive position other than one that produces engine braking, for example, the overdrive range or the 3-range; the vehicle speed as determined by the speed of output shaft 44, is less than a predetermined value, for example, 25 mph; and the throttle is closed or is opened equal to or less than a predetermined angle as indicated by the position of throttle angle sensor 104. When the neutral idle control is enabled, the absolute value of the difference between engine speed and turbine speed, $|NE-NT|$, is controlled to a predetermined value by modulating the forward clutch pressure. If the conditions for neutral idle are not satisfied, the neutral idle control is not activated and forward clutch pressure is determined by other means which may be conventional hydraulic control or a computer controlled clutch pressure. If the conditions for neutral idle control are present, the control system decreases the torque placed on the engine, provided $|NE-NT|$ is greater than the predetermined difference between engine speed and torque speed, by reducing the forward clutch pressure. If the conditions for neutral idle control are satisfied and the difference between engine speed and turbine speed is less than the predetermined value, the torque placed on the engine is increased by increasing the forward clutch pressure.

The logic by which the neutral idle system operates is controlled by a computer program stored in program memory 158, which operates on the strategy indicated in the flow chart of FIG. 6. The feedback error signal upon which the strategy is based is the difference between the current value of the engine turbine speed difference $|NE-NT|$ and the predetermined value for this variable. The error is used as a measure of forward clutch torque capacity for control in the neutral idle mode. Information concerning the shaft speeds, the setting of the gear selector and the throttle angle is stored in data memory 160, which is accessible to the control unit via data bus 108.

The desired speed difference, L, during neutral idle modulation is chosen as low as possible to provide the maximum fuel economy benefit while allowing the forward clutch to be reapplied without noticeable delay. For example, with the forward clutch fully vented the value of the speed difference L may be perhaps 10 rpm. When the speed difference is greater, 75 rpm, for example, the forward clutch torque capacity may be great enough to produce vehicle creep at idle conditions. Between these extremes a desired or predetermined value of the speed difference can be used as an indication that the forward clutch is pressurized sufficiently so that it can be fully engaged without noticeable delay, yet low enough so that engine torque is reduced and fuel economy realized.

The forward clutch duty cycle during the neutral idle control is determined as the solution to the following equation:

$$DC_c = DC_p - KP(|NE-NT|_c - L) - KD(-|NE-NT|_c - |NE-NT|_p)$$

where $DC_c$ is the current duty cycle;

$DC_p$ is a previously calculated duty cycle whose value is determined as a solution to this equation;

$|NE-NT|_c$ is the current difference in speed between the engine shaft and turbine shaft most recently calculated;

$|NE-NT|_p$ is a previous difference in speed between the engine shaft and turbine shaft;

L is the desired or predetermined difference between the engine speed and turbine speed;

KP is the proportional gain; and

KD is the derivative gain.

In this equation the current value of the difference in speed between the engine and the turbine shafts minus the predetermined or desired value, L, of such speed difference is considered the feedback error, which when multiplied by KP corrects the previously calculated duty cycle by a value that varies proportionally with the magnitude of the error. Differential gain, KD, times the change in the error from the previously calculated value of the speed difference to the currently calculated value of the speed difference corrects the previously calculated duty cycle on the basis of the change of the error. When KP is set equal to 0.003 and KD to 0.060, the equation provides the best combination of system response and stability. These values for KP and KD produce a well damped, stable control that provides a good sense of engagement during the neutral idle modulation.

Having described the preferred embodiment of our invention what we claim and desire to secure by U.S. Letters Patent is:

1. A control system for controlling the magnitude of torque transmitted through a clutch of an automatic transmission comprising:

a throttle sensor which generates a signal that represents the throttle opening of a throttle controlled engine;

an engine speed sensor which detects a value that represents the engine rotational speed, NE;

a gear ratio sensor which generates a signal that represents disposition of the gear selector in a forward drive position;

a shaft speed sensor which generates a signal that represents the speed of the vehicle;

a torque converter having an impeller drivably connected to the engine crankshaft and a turbine driven from the impeller;

a turbine speed sensor which generates a value that represents the turbine speed, NT;

a solenoid operated valve that opens and closes communication between a source of pressurized fluid and the clutch and between atmosphere and the clutch, thereby pressurizing and venting the clutch as the solenoid windings are energized and deenergized;

computing means for repetitively computing the duty cycle of the solenoid provided the gear ratio selector is disposed and in an acceptable forward drive position, the throttle setting is equal to or less than a predetermined setting and the vehicle speed is equal to or less than a predetermined speed, having a data base that includes the values of the proportional gain, KP, the derivative gain, KD, and the desired absolute difference between engine speed and turbine speed, L, adapted to repetitively calculate current instantaneous speed difference values $|NE-NT|_c$, to store in memory and recall from memory previously calculated instantaneous speed difference values $|NE-NT|_p$ and previously calculated duty cycle values, $DC_p$, and to repetitively calculate the current duty cycle, $DC_c$, from the relationship $$DC_c = DC_p - KP(|NE-NT|_c - L) - KD(|NE-NT|_c - |NE-NT|_p);$$

and means for converting the binary value of the current duty cycle to an analog current that energizes the solenoid.

2. The control system of claim 1 wherein the solenoid operated valve comprises:

an inlet port communicating with the pressure source, an outlet port communicating with the clutch and a vent port;

a valve member movable between a first state where the inlet port is closed and the vent port is connected to the clutch and a second state where the inlet port is connected to the clutch and the vent port is closed;

means biasing the valve member to the second state if the solenoid is deenergized; and means for moving the valve member to the first state if the solenoid is energized.

3. The control system of claim 2 wherein the solenoid operated valve comprises:

means biasing the valve member to the first state if the solenoid is deenergized; and means for moving the valve member to the second state if the solenoid is energized.

4. The control system of claim 1 wherein the converting means includes means for producing a pulse width modulated signal from the current duty cycle calculated by the computing means.

5. The control system of claim 4 wherein the pulse width modulated signal producing means comprises:

digital-to-analog converter means for converting the binary value of the current duty cycle to an analog voltage whose magnitude varies in proportion to the value of the current duty cycle;

an oscillator producing a constant peak amplitude triangular voltage pulse having a constant frequency;

a comparator wherein the magnitude of the analog voltage equivalent of the calculated duty cycle is compared to the instantaneous amplitude of the triangular wave producing an output that is a voltage pulse wave of constant amplitude whose pulse width is the period during which the magnitude of the analog voltage is equal to or greater than the instantaneous amplitude of the triangular wave and which is low when the analog voltae is less than the instantaneous amplitude of the triangular wave;

amplifier means producing a current during the period when the comparator output is high and no current when the comparator output is low;

means for applying the current pulse to the solenoid coils.

6. A method for controlling with the aid of a digital computer the magnitude of torque transmitted between a throttle engine and an output shaft through a clutch of an automatic transmission having a torque converter turbine and a solenoid valve that operates to engage and disengage the clutch comprising:

providing said computer with a data base that includes at least
a predetermined engine throttle angle,
predetermined transmission gear selector positions,
a predetermined vehicle speed,
the proportional gain, KP,
the derivative gain, KD, and
a desired absolute difference between the engine speed and turbine speed, L;
continually determining and providing the computer with the current throttle opening of the engine, the current speeds of the engine, turbine and vehicle, the current setting of the gear selector and the speeds of the engine and turbine that were determined during a previous computing period;
executing the following steps provided the gear selector is set at one of the predetermined gear selector positions and the throttle angle is equal to or less than the predetermined throttle angle and the vehicle speed is equal to or less than the predetermined vehicle speed;
repetively calculating in the computer at frequent periodic intervals the equation:

$$DC_c = DC_p - KP(|NE-NT|_c - L) - KD(-|NE-NT|_c - |NE-NT|_p)$$

where
$DC_c$ and $DC_p$ are the current duty cycle and previous duty cycle calculated during a previous computing period;
converting the calculated current duty cycle to a voltage pulse wave; and
energizing the solenoid valve by applying the voltage pulse wave to the windings of the solenoid.

7. The method of claim 6 wherein converting the current duty cycle to an analog current comprises:
converting the value of the current duty cycle to an analog voltage whose magnitude is proportional to magnitude of the duty cycle;
producing a constant peak amplitude triangular voltage pulse wave having a constant frequency;
comparing the magnitude of the analog voltage equivalent of the calculated duty cycle to the instantaneous amplitude of the triangular wave;
producing a voltage pulse wave of constant amplitude whose pulse width is the period during which the magnitude of the analog voltage is equal to or greater than the instantaneous amplitude of the triangular wave and which is low when the analog voltage is less than the instantaneous amplitude of the triangular wave; and
applying the voltage pulse wave to the coil of the solenoid valve.

8. A method for controlling the magnitude of torque transmitted from a throttle controlled engine through a clutch of an automatic transmission having a torque converter turbine and a gear selector:
executing the following steps provided the gear selector is set at a predetermined gear selector position, the throttle angle, is equal to or less than a predetermined throttle angle and the vehicle speed is equal to or less than a predetermined vehicle speed;
communicating a source of pressurized fluid to the clutch cylinder through a solenoid operated valve when the valve is open and communicating the clutch cylinder to atmosphere when the valve is closed, whereby the clutch is engaged and disengaged as the solenoid is energized and deenergized;
repetitively calculating at frequent periodic intervals while the method is enabled to equation $$DC_c = DC_p - KP(|NE-NT|_c - L) - KD(-|NE-NT|_c - |NE-NT|_p);$$

wherein
$DC_c$ is the current duty cycle, $DC_p$ is previous duty cycle calculated during a previous computing period, KP and KD are the proportional gain and differential gain of the control system, respectively, $|NE-NT|_c$ and $|NE-NT|_p$ are the absolute current difference between engine speed, NE, and turbine speed, NT, and said speed difference during a previous computing period, respectively, and L is the desired absolute difference between engine speed and turbine speed;
converting the calculated current duty cycle to voltage pulse wave of constant amplitude; and
energizing and deenergizing the solenoid by applying the voltage wave to the windings of the solenoid.

9. The method of claim 8 wherein converting the current duty cycle to an analog current comprises:
converting the value of the current duty cycle to an analog voltage whose magnitude is proportional to magnitude of the duty cycle;
producing a constant peak amplitude triangular voltage pulse wave having a constant frequency;
comparing the magnitude of the analog voltage equivalent of the calculated duty cycle to the instantaneous amplitude of the triangular wave;
producing a voltage pulse wave of constant amplitude whose pulse width is the period during which the magnitude of the analog voltage is equal to or greater than the instantaneous amplitude of the triangular wave and which is low when the analog voltage is less than the instantaneous amplitude of the triangular wave; and
applying the voltage pulse wave to the coil of the solenoid valve.

* * * * *